United States Patent
Yong et al.

(10) Patent No.: US 9,490,463 B2
(45) Date of Patent: Nov. 8, 2016

(54) ORGANIC/INORGANIC COMPOSITE POROUS FILM AND ELECTROCHEMICAL DEVICE PREPARED THEREBY

(71) Applicants: LG CHEM, LTD., Seoul (KR); TORAY BATTERY SEPARATOR FILM CO., LTD., Nasushiobara-shi, Tochigi (JP)

(72) Inventors: Hyun Hang Yong, Seoul (KR); Sang Young Lee, Daejeon (KR); Seok Koo Kim, Daejeon (KR); Soon Ho Ahn, Daejeon (KR); Jung Don Suk, Daejeon (KR)

(73) Assignees: LG CHEM, LTD., Seoul (KR); TORAY BATTERY SEPARATOR FILM CO., LTD, Nasushiobara-shi, Tochigi (JP)

( * ) Notice: Subject to any disclaimer, the term of this patent is extended or adjusted under 35 U.S.C. 154(b) by 0 days.

(21) Appl. No.: 13/785,260

(22) Filed: Mar. 5, 2013

(65) Prior Publication Data
US 2013/0183570 A1    Jul. 18, 2013

Related U.S. Application Data

(63) Continuation of application No. 11/217,918, filed on Sep. 1, 2005, now Pat. No. 8,409,746.

(30) Foreign Application Priority Data

| Sep. 2, 2004 | (KR) | 10-2004-0070095 |
| Sep. 2, 2004 | (KR) | 10-2004-0070096 |
| Feb. 3, 2005 | (KR) | 10-2005-0009999 |

(51) Int. Cl.
*H01M 2/16* (2006.01)
*H01M 2/18* (2006.01)
(Continued)

(52) U.S. Cl.
CPC ........... *H01M 2/166* (2013.01); *H01M 2/1686* (2013.01); *H01M 2/18* (2013.01);
(Continued)

(58) Field of Classification Search
CPC .. H01M 2/166; H01M 10/056; H01M 10/23; H01M 10/0088; H01M 10/0091; H01M 10/0094; H01M 10/0097
See application file for complete search history.

(56) References Cited

U.S. PATENT DOCUMENTS

| 4,540,640 A | 9/1985 | Iacovangelo et al. |
| 4,615,913 A | 10/1986 | Jones et al. |

(Continued)

FOREIGN PATENT DOCUMENTS

| CN | 1259773 A | 7/2000 |
| CN | 1388993 A | 1/2003 |

(Continued)

OTHER PUBLICATIONS

Declaration Under 37 CFR 1.132 filed on Jul. 15, 2011 in parent U.S. Appl. No. 11/217,918 (now U.S. Pat. No. 8,409,746).*

(Continued)

*Primary Examiner* — Ula C Ruddock
*Assistant Examiner* — Amanda Barrow
(74) *Attorney, Agent, or Firm* — Birch, Stewart, Kolasch & Birch, LLP (57) ABSTRACT

Disclosed is an organic/inorganic composite porous film comprising: (a) inorganic particles; and (b) a binder polymer coating layer formed partially or totally on surfaces of the inorganic particles, wherein the inorganic particles are interconnected among themselves and are fixed by the binder polymer, and interstitial volumes among the inorganic particles form a micropore structure. A method for manufacturing the same film and an electrochemical device including the same film are also disclosed. An electrochemical device comprising the organic/inorganic composite porous film shows improved safety and quality.

15 Claims, 4 Drawing Sheets

(51) Int. Cl.
*H01M 10/0525* (2010.01)
*H01M 10/42* (2006.01)

(52) U.S. Cl.
CPC ..... *H01M10/0525* (2013.01); *H01M 10/4235* (2013.01); *Y02E 60/122* (2013.01); *Y02P 70/54* (2015.11); *Y02T 10/7011* (2013.01); *Y10T 428/2998* (2015.01)

(56) References Cited

U.S. PATENT DOCUMENTS

| | | | |
|---|---|---|---|
| 4,637,990 A | 1/1987 | Torobin | |
| 5,336,573 A | 8/1994 | Zuckerbrod et al. | |
| 5,378,551 A * | 1/1995 | Meadows | H01M 2/16 429/122 |
| 5,654,114 A | 8/1997 | Kubota et al. | |
| 5,695,873 A * | 12/1997 | Kumar et al. | 428/325 |
| 5,707,567 A | 1/1998 | Pfaff | |
| 5,858,264 A * | 1/1999 | Ichino et al. | 252/62.2 |
| 5,882,721 A * | 3/1999 | Delnick | 427/77 |
| 5,948,464 A | 9/1999 | Delnick | |
| 5,965,299 A * | 10/1999 | Khan | C08F 292/00 429/302 |
| 6,261,721 B1 | 7/2001 | Andrieu et al. | |
| 6,270,928 B1 | 8/2001 | Andrieu et al. | |
| 6,277,514 B1 | 8/2001 | Ying et al. | |
| 6,281,257 B1 | 8/2001 | Ma et al. | |
| 6,287,720 B1 | 9/2001 | Yamashita et al. | |
| 6,299,653 B1 | 10/2001 | Hoshi et al. | |
| 6,328,770 B1 | 12/2001 | Gozdz | |
| 6,355,380 B1 | 3/2002 | Yun et al. | |
| 6,387,564 B1 * | 5/2002 | Yamashita et al. | 429/132 |
| 6,416,905 B1 | 7/2002 | Bronstert et al. | |
| 6,423,444 B1 | 7/2002 | Ying et al. | |
| 6,432,586 B1 | 8/2002 | Zhang | |
| 6,447,958 B1 * | 9/2002 | Shinohara | H01M 2/145 429/248 |
| 6,558,840 B1 | 5/2003 | Hikmet | |
| 6,632,561 B1 * | 10/2003 | Bauer et al. | 429/144 |
| 6,656,641 B1 * | 12/2003 | Kumar | H01M 4/70 252/62.2 |
| 6,676,713 B1 | 1/2004 | Okada et al. | |
| 6,726,733 B2 | 4/2004 | Lee et al. | |
| 7,115,339 B2 | 10/2006 | Nakajima et al. | |
| 7,211,352 B2 | 5/2007 | Lee et al. | |
| 7,662,517 B2 | 2/2010 | Lee et al. | |
| 7,682,740 B2 | 3/2010 | Yong et al. | |
| 7,704,641 B2 * | 4/2010 | Yong | C08J 7/04 428/689 |
| 9,017,878 B2 * | 4/2015 | Kim | H01M 2/1673 429/247 |
| 2001/0005560 A1 * | 6/2001 | Yoshida et al. | 429/144 |
| 2001/0036573 A1 | 11/2001 | Jen et al. | |
| 2002/0045091 A1 | 4/2002 | Kamei et al. | |
| 2002/0055046 A1 * | 5/2002 | Ono | H01G 9/2009 429/324 |
| 2002/0092155 A1 | 7/2002 | Carlson et al. | |
| 2002/0102455 A1 * | 8/2002 | Daroux | B32B 27/08 429/144 |
| 2002/0102456 A1 | 8/2002 | Aihara et al. | |
| 2002/0119374 A1 | 8/2002 | Yang et al. | |
| 2002/0214089 A1 | 8/2002 | Daroux et al. | |
| 2002/0132169 A1 | 9/2002 | Yamamoto et al. | |
| 2002/0160256 A1 * | 10/2002 | Kami | H01M 2/145 429/122 |
| 2002/0185627 A1 * | 12/2002 | Chen-Yang | H01B 1/122 252/62.2 |
| 2002/0187401 A1 * | 12/2002 | Lee | B01D 67/0027 429/303 |
| 2002/0192561 A1 | 12/2002 | Noh | |
| 2003/0017386 A1 | 1/2003 | Daido et al. | |
| 2003/0031924 A1 * | 2/2003 | Lee | B01D 39/16 429/142 |
| 2003/0044684 A1 | 3/2003 | Nanamoto et al. | |
| 2003/0054245 A1 * | 3/2003 | Barton | B29C 47/145 429/212 |
| 2003/0104273 A1 | 6/2003 | Lee et al. | |
| 2003/0157409 A1 | 8/2003 | Huang | |
| 2003/0180623 A1 | 9/2003 | Yun et al. | |
| 2004/0023117 A1 | 2/2004 | Imachi et al. | |
| 2004/0062990 A1 * | 4/2004 | Shimamura et al. | 429/218.1 |
| 2004/0106037 A1 | 6/2004 | Cho et al. | |
| 2004/0146778 A1 | 7/2004 | Lee et al. | |
| 2004/0214089 A1 | 10/2004 | Lee et al. | |
| 2005/0266150 A1 | 12/2005 | Yong et al. | |
| 2006/0078791 A1 * | 4/2006 | Hennige | H01M 2/1646 429/145 |
| 2006/0105245 A1 | 5/2006 | Ikuta et al. | |
| 2006/0234117 A1 | 10/2006 | Fujikawa et al. | |
| 2007/0042270 A1 * | 2/2007 | Ohata | H01M 2/166 429/246 |
| 2007/0122715 A1 | 5/2007 | Fujino et al. | |
| 2007/0184350 A1 | 8/2007 | Kim et al. | |
| 2008/0241566 A1 * | 10/2008 | Hoefflin et al. | 428/500 |
| 2008/0245735 A1 * | 10/2008 | Hennige | B01D 53/228 210/650 |
| 2009/0273119 A1 | 11/2009 | Imai | |
| 2009/0305141 A1 | 12/2009 | Lee et al. | |
| 2011/0064988 A1 | 3/2011 | Yu | |
| 2011/0228276 A1 | 9/2011 | Hiranaka et al. | |
| 2011/0255211 A1 | 10/2011 | Koh et al. | |
| 2013/0101885 A1 * | 4/2013 | Lee et al. | 429/144 |

FOREIGN PATENT DOCUMENTS

| | | | |
|---|---|---|---|
| EP | 0 814 520 A2 | 12/1997 | |
| EP | 1 049 188 B1 | 9/2002 | |
| JP | 55-165572 A | 12/1980 | |
| JP | 56-32674 A | 4/1981 | |
| JP | 1981-32674 A | 4/1981 | |
| JP | 05-074466 | * 3/1993 | H01M 6/18 |
| JP | 5-74466 A | 3/1993 | |
| JP | 5-314995 A | 11/1993 | |
| JP | 07-220759 H | 8/1995 | |
| JP | H07-220759 A | 8/1995 | |
| JP | H09-95700 A | 4/1997 | |
| JP | 10-106530 A | 4/1998 | |
| JP | 10-241656 H | 9/1998 | |
| JP | 10-334877 A | 12/1998 | |
| JP | 11-80395 A | 3/1999 | |
| JP | 2000-228223 | 8/2000 | |
| JP | 2001-185114 A | 7/2001 | |
| JP | 2001-319634 A | 11/2001 | |
| JP | 2001-527274 A | 12/2001 | |
| JP | 2002-8724 A | 1/2002 | |
| JP | 2002-151044 A | 5/2002 | |
| JP | 2002-529891 A | 9/2002 | |
| JP | 2002-532852 A | 10/2002 | |
| JP | 2002-541632 A | 12/2002 | |
| JP | 2003-7279 A | 1/2003 | |
| JP | 2003-022707 A | 1/2003 | |
| JP | 2003-59480 A | 2/2003 | |
| JP | 2004-519824 A | 7/2004 | |
| JP | 2004-227972 A | 8/2004 | |
| JP | 2004-273437 A | 9/2004 | |
| JP | 2005-146243 A | 6/2005 | |
| JP | 2005-276503 A | 10/2005 | |
| JP | 2005-294216 | 10/2005 | |
| JP | 2005-327680 A | 11/2005 | |
| JP | 2007-531234 A | 11/2007 | |
| JP | 2010-517811 A | 5/2010 | |
| KR | 10-1998-0011946 A | 10/1998 | |
| KR | 10-2000-0059999 A | 10/2000 | |
| KR | 10-2000-0061755 A | 10/2000 | |
| KR | 10-2001-0080496 A | 8/2001 | |
| KR | 10-2001-0091048 A | 10/2001 | |
| KR | 10-2001-0095623 A | 11/2001 | |
| KR | 10-2002-0006387 A | 1/2002 | |
| KR | 10-2002-0070882 A | 9/2002 | |
| KR | 10-2002-0078660 A | 10/2002 | |
| KR | 10-2003-0007659 A | 1/2003 | |
| KR | 10-2003-0036966 A | 5/2003 | |
| KR | 10-2003-0065074 A | 8/2003 | |

(56) References Cited

FOREIGN PATENT DOCUMENTS

| KR | 10-2003-0079326 A | 10/2003 | | |
|---|---|---|---|---|
| KR | 10-2003-0089750 A | 11/2003 | | |
| KR | 10-2004-0005550 A | 1/2004 | | |
| KR | 10-2004-0015999 A | 2/2004 | | |
| KR | 10-2005-0038254 A | 4/2005 | | |
| KR | 10-2005-0066652 A | 6/2005 | | |
| KR | 10-2006-0021222 A | 3/2006 | | |
| KR | 10-2006-0072065 A | 6/2006 | | |
| KR | 10-2007-0000231 A | 1/2007 | | |
| RU | 2218634 C2 | 12/2003 | | |
| WO | WO 97/08763 A1 | 3/1997 | | |
| WO | WO 98/38688 A1 | 9/1998 | | |
| WO | WO 99/36981 | 7/1999 | | |
| WO | WO 00/31812 A1 | 6/2000 | | |
| WO | WO 00/38263 A1 | 6/2000 | | |
| WO | WO 02/15299 A1 | 2/2002 | | |
| WO | WO 02/071509 A1 | 9/2002 | | |
| WO | WO 02/092638 A1 | 11/2002 | | |
| WO | WO 2004/021477 A1 | 3/2004 | | |
| WO | WO 2004/049471 | * | 6/2004 | .............. H01M 2/16 |
| WO | WO 2005/038959 | * | 4/2005 | .............. H01M 2/16 |
| WO | WO 2005/067080 A1 | 7/2005 | | |
| WO | WO 2005/076388 A1 | 8/2005 | | |
| WO | WO 2005/078828 | * | 8/2005 | .............. H01M 4/02 |
| WO | WO 2005/124899 A1 | 12/2005 | | |
| WO | WO 2006/004366 A1 | 1/2006 | | |
| WO | WO 2006/062349 A1 | 6/2006 | | |
| WO | WO 2006/068428 A1 | 6/2006 | | |
| WO | WO 2007/021083 A1 | 2/2007 | | |
| WO | WO 2008/097013 A1 | 8/2008 | | |
| WO | WO 2013/168313 A1 | 11/2013 | | |

OTHER PUBLICATIONS

Celguard(R) 2400 Product Information Sheet, accessed at http://www.celgard.com/CMS/CelgardFiles/Comm-04-12/2400_Data_Sheet_2012-03_20033.pdf, Published Mar. 2012.*
Abraham, K.M. et al., "Inorganic-Organic Composite Solid Polymer Electrolytes," J. of the Electrochemical Society, 2000; 147(4); 1251-1256.
Augustin, S. et al., "Ceramic but flexible: new ceramic membrane foils for fuel cells and batteries," Desalination, 2002; 146; 23-28.
Chinese Office Action dated Jul. 3, 2009; LG Chem, Ltd., Application No. 200580027284.2.
Chung, S.H. et al., "Enhancement of ion transport in polymer electrolytes by addition of nanoscale inorganic oxideides," Journal of Power Sources, 2001; vol. 97-98: 644-648.
Presentation of Information (in Japanese) cited in Official Notice for Japanese Patent Office dated Mar. 2, 2010.
English translation of Taiwanese Office Action dated Oct. 1, 2007 for Application No. 94128057.
Final Office Action issued for U.S. Appl. No. 11/051,610 dated Jun. 29, 2009.
Hayashi et al, Electrochimica Acta, 2003, vol. 48, No. 14, pp. 2003-2008.
Hikmet, R.A.M., "New lithium-ion polymer battery concept for increase capacity," Joural of Power Sources, 2001, vol. 92, pp. 212-220.
Inada et al, Solid State Ionics, 2003, vol. 158, No. 3, pp. 275-280.
Japanese Office Action mailed Apr. 2, 2010.
Korean International Search Report for PCT/KR2005/000358 dated May 24, 2005.
Korean International Search Report for PCT/KR2005/002133 dated Oct. 18, 2005.
Korean International Search Report for PCT/KR2005/004450 dated Apr. 7, 2006.
Korean International Search Report for PCT/KR2006/005221 dated Mar. 12, 2007.
Korean Office Action for Application No. 1020050126878 dated Apr. 30, 2007.
Letter (in English) dated Mar. 25, 2010 describing content of Official Notice dated Mar. 2, 2010 from the Japanese Patent Office.
Li, Q. et al., "Four volts class solid lithium polymer batteries with a composite polymer electrolyte," Journal of Power Sources, 2002; 110 (1): 38-45.
Notification of Third Office Action of the People's Republic of China; Application No. 200580027284.2; Dated Mar. 13, 2009.
Office Action issued for U.S. Appl. No. 11/175,881 dated Jul. 1, 2009.
Office Action issued for U.S. Appl. No. 11/721,259 dated Feb. 24, 2009.
Office Action issued for U.S. Appl. No. 11/051,610 dated Nov. 28, 2008.
Park, C.H. et al., "Electrochemical stability and conductivity enhancement of composite polymer electrolytes," Solid State Ionics, 2003; 159 (1): 111-119.
PCT International Search Report, PCT International Application No. PCT/KR2005/002674, Date of Mailing: Nov. 28, 2005.
Prosini, P. P. et al, "A novel intrinsically porous separator for self-standing lithium-ion batteries," Electrochimca Acta, 2002, vol. 48, pp. 227-233.
Russian Office Action for PCT/KR2005/002133 dated Jan. 21, 2008.
Solubility Parameter Table, source: (http:llen.wikipedia.orglwikilHildebrand_solubility_parameter), cited in U.S. Appl. No. 11/175,881 on Oct. 1, 2009.
US Final Office Action for U.S. Appl. No. 12/094,578 dated Sep. 14, 2011.
US Office Action for U.S. Appl. No. 12/093,404 dated May 26, 2011.
US Office Action for U.S. Appl. No. 12/094,578 dated May 2, 2011.
US Office Action for U.S. Appl. No. 13/184,288 dated Jan. 25, 2012.
Written Opinion for PCT/KR2006/005221 dated Mar. 12, 2007.
Zheng et al., Journal of Power Sources, 2002, vol. 112, No. 1, pp. 209-215.
"Solef PVDF for Safe and Flexible Battery Separators", SOLVAY Specialty Polymers, www.SolvaySpecialtyPolymers.com, (2013) pp. 1-6.
Fishman et al., "Pigment Inhomogeneity and Void Formation in Organic Coating", Progress in Organic Coatings, vol. 21 (1993) pp. 387-403.

* cited by examiner

ORGANIC/INORGANIC COMPOSITE POROUS FILM AND ELECTROCHEMICAL DEVICE PREPARED THEREBY

This application is a Continuation of co-pending U.S. application Ser. No. 11/217,918, filed Sep. 1, 2005. This application also claims the benefit of Patent Application Nos. 10-2004-70095 filed in Republic of Korea on Sep. 2, 2004, 10-2004-70096 filed in Republic of Korea on Sep. 2, 2004 and 10-2005-9999 filed in Republic of Korea on Feb. 3, 2005. All of the above applications are hereby expressly incorporated by reference into the present application.

TECHNICAL FIELD

The present invention relates to a novel organic/inorganic composite porous film that can show excellent thermal safety and lithium ion conductivity and a high degree of swelling with electrolyte compared to conventional polyolefin-based separators, and an electrochemical device comprising the same, which ensures safety and has improved quality.

BACKGROUND ART

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention.

Secondary batteries are chemical batteries capable of repeated charge and discharge cycles by means of reversible interconversion between chemical energy and electric energy, and may be classified into Ni-MH secondary batteries and lithium secondary batteries. Lithium secondary batteries include lithium secondary metal batteries, lithium secondary ion batteries, lithium secondary polymer batteries, lithium secondary ion polymer batteries, etc.

Because lithium secondary batteries have drive voltage and energy density higher than those of conventional batteries using aqueous electrolytes (such as Ni-MH batteries), they are produced commercially by many production companies. However, most lithium secondary batteries have different safety characteristics depending on several factors. Evaluation of and security in safety of batteries are very important matters to be considered. Therefore, safety of batteries is strictly restricted in terms of ignition and combustion in batteries by safety standards.

Currently available lithium ion batteries and lithium ion polymer batteries use polyolefin-based separators in order to prevent short circuit between a cathode and an anode. However, because such polyolefin-based separators have a melting point of 200° C. or less, they have a disadvantage in that they can be shrunk or molten to cause a change in volume when the temperature of a battery is increased by internal and/or external factors. Therefore, there is a great possibility of short-circuit between a cathode and an anode caused by shrinking or melting of separators, resulting in accidents such as explosion of a battery caused by emission of electric energy. As a result, it is necessary to provide a separator that does not cause heat shrinking at high temperature.

To solve the above problems related with polyolefin-based separators, many attempts are made to develop an electrolyte using an inorganic material serving as a substitute for a conventional separator. Such electrolytes may be broadly classified into two types. The first type is a solid composite electrolyte obtained by using inorganic particles having lithium ion conductivity alone or by using inorganic particles having lithium ion conductivity mixed with a polymer matrix. See, Japanese Laid-Open Patent No. 2003-022707, ["Solid State Ionics"-vol. 158, n. 3, p. 275, (2003)], ["Journal of Power Sources"-vol. 112, n. 1, p. 209, (2002)], ["Electrochimica Acta"-vol. 48, n. 14, p. 2003, (2003)], etc. However, it is known that such composite electrolytes are not advisable, because they have low ion conductivity compared to liquid electrolytes and the interfacial resistance between the inorganic materials and the polymer is high while they are mixed.

The second type is an electrolyte obtained by mixing inorganic particles having lithium ion conductivity or not with a gel polymer electrolyte formed of a polymer and liquid electrolyte. In this case, inorganic materials are introduced in a relatively small amount compared to the polymer and liquid electrolyte, and thus merely have a supplementary function to assist in lithium ion conduction made by the liquid electrolyte.

However, because electrolytes prepared as described above have no pores therein or, if any have pores with a size of several angstroms and low porosity, formed by introduction of an artificial plasticizer, the electrolytes cannot serve sufficiently as separator, resulting in degradation in the battery quality.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

We have found that an organic/inorganic composite porous film, formed by using (1) inorganic particles and (2) a binder polymer, improves poor thermal safety of a conventional polyolefin-based separator. Additionally, we have found that because the organic/inorganic composite porous film has a micropore structure formed by the inorganic particles present in the film, it provides an increased volume of space into which a liquid electrolyte infiltrates, resulting in improvements in lithium ion conductivity and degree of swelling with electrolyte. Therefore, the organic/inorganic composite porous film can improve the quality and safety of an electrochemical device using the same as separator.

Therefore, it is an object of the present invention to provide an organic/inorganic composite porous film capable of improving the quality and safety of an electrochemical device, a method for manufacturing the same and an electrochemical device comprising the same.

According to an aspect of the present invention, there is provided an organic/inorganic composite porous film, which comprises (a) inorganic particles; and (b) a binder polymer coating layer formed partially or totally on the surface of the inorganic particles, wherein the inorganic particles are interconnected among themselves and are fixed by the binder polymer, and interstitial volumes among the inorganic particles form a micropore structure. There is also provided an electrochemical device (preferably, a lithium secondary battery) comprising the same.

According to another aspect of the present invention, there is provided a method for manufacturing an organic/inorganic composite porous film, which includes the steps of: (a) dissolving a binder polymer into a solvent to form a polymer solution; (b) adding inorganic particles to the polymer solution obtained from step (a) and mixing them; and (c) coating the mixture of inorganic particles with binder polymer obtained from step (b) on a substrate, followed by drying, and then detaching the substrate.

Hereinafter, the present invention will be explained in more detail.

The present invention is characterized in that it provides a novel organic/inorganic composite porous film, which serves sufficiently as separator to prevent electrical contact between a cathode and an anode of a battery and to pass ions therethrough and shows excellent thermal safety, lithium ion conductivity and degree of swelling with electrolyte.

The organic/inorganic composite porous film is obtained by using inorganic particles and a binder polymer. The uniform and heat resistant micropore structure formed by the interstitial volumes among the inorganic particles permits the organic/inorganic composite porous film to be used as separator. Additionally, if a polymer capable of being gelled when swelled with a liquid electrolyte is used as the binder polymer component, the organic/inorganic composite porous film can serve also as electrolyte.

Particular characteristics of the organic/inorganic composite porous film are as follows.

(1) The organic/inorganic composite porous film according to the present invention shows improved thermal safety by virtue of the inorganic particles present therein.

In other words, although conventional polyolefin-based separators cause heat shrinking at high temperature because they have a melting point of 120-140° C., the organic/inorganic composite porous film comprising the inorganic particles and binder polymer does not cause heat shrinking due to the heat resistance of the inorganic particles. Therefore, an electrochemical device using the above organic/inorganic composite porous film as separator causes no degradation in safety resulting from an internal short circuit between a cathode and an anode even under extreme conditions such as high temperature, overcharge, etc. As a result, such electrochemical devices have excellent safety characteristics compared to conventional batteries.

Figure 1:
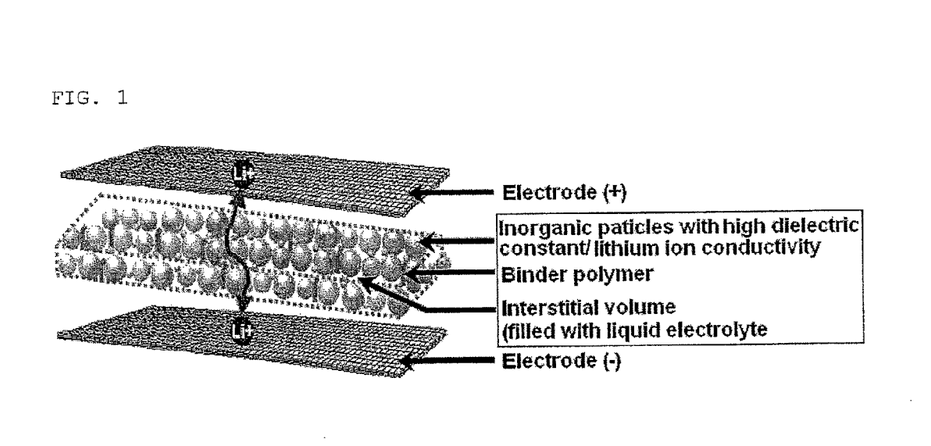
FIG. 1 is a schematic view showing an organic/inorganic composite porous film according to the present invention.
Figure 2:
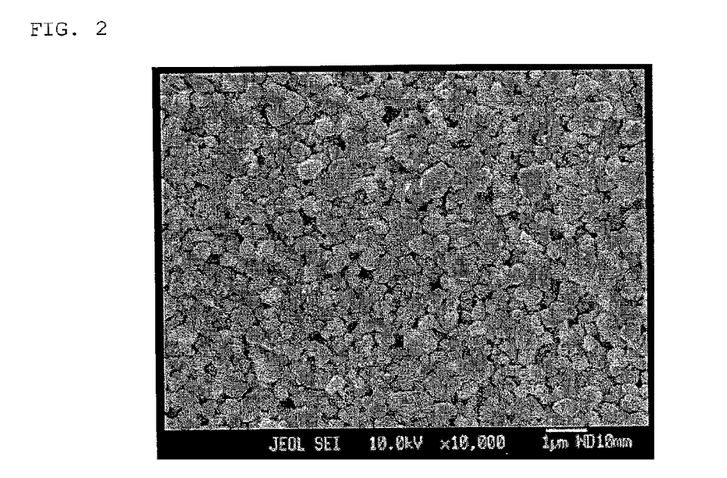
FIG. 2 is a photograph taken by Scanning Electron Microscope (SEM) showing the organic/inorganic composite porous film (PVdF—HFP/$BaTiO_3$) according to Example 1.

(2) Conventional solid electrolytes formed by using inorganic particles and a binder polymer have no pore structure or, if any, have an irregular pore structure having a pore size of several angstroms. Therefore, they cannot serve sufficiently as spacer, through which lithium ions can pass, resulting in degradation in the quality of a battery. On the contrary, the organic/inorganic composite porous film according to the present invention has uniform micropore structures formed by the interstitial volumes among the inorganic particles as shown in FIGS. 1 and 2, and the micropore structures permit lithium ions to move smoothly therethrough. Therefore, it is possible to introduce a large amount of electrolyte through the micropore structures so that a high degree of swelling with electrolyte can be obtained, resulting in improvement in the quality of a battery.

(3) It is possible to control the pore size and porosity of the organic/inorganic composite porous film by varying the particle diameter of the inorganic particles and the mixing ratio of the inorganic particles with the polymer. The micropore structure is subsequently filled with a liquid electrolyte so that the interfacial resistance generating among the inorganic particles or between the inorganic particles and the binder polymer can be reduced significantly.

(4) When the inorganic particles used in the organic/inorganic composite porous film have a high dielectric constant and/or lithium ion conductivity, the inorganic particles can improve lithium ion conductivity as well as heat resistance, thereby contributing to improvement of battery quality.

(5) When the binder polymer used in the organic/inorganic composite porous film is one showing a high degree of swelling with electrolyte, the electrolyte injected after assemblage of a battery can infiltrate into the polymer and the resultant polymer containing the electrolyte infiltrated therein has a capability of conducting electrolyte ions. Therefore, the organic/inorganic composite porous film according to the present invention can improve the quality of an electrochemical device compared to conventional organic/inorganic composite electrolytes. Additionally, the organic/inorganic composite porous film provides advantages in that wettablity with an electrolyte is improved compared to conventional hydrophobic polyolefin-based separators, and use of a polar electrolyte for battery is permitted.

6) Finally, if the binder polymer is one capable of being gelled when swelled with electrolyte, the polymer reacts with the electrolyte injected subsequently and is gelled, thereby forming a gel type organic/inorganic composite electrolyte. Such electrolytes are produced with ease compared to conventional gel-type electrolytes and show excellent ion conductivity and a high degree of swelling with electrolyte, thereby contributing to improve the quality of a battery.

(7) In the battery separator, a packing density of the inorganic particles may be greater than a packing density of the binder polymer.

One component present in the organic/inorganic composite porous film according to the present invention is inorganic particles currently used in the art. The inorganic particles permit interstitial volumes to be formed among them, thereby serving to form micropores and to maintain the physical shape as spacer. Additionally, because the inorganic particles are characterized in that their physical properties are not changed even at a high temperature of 200° C. or higher, the organic/inorganic composite porous film using the inorganic particles can have excellent heat resistance.

There is no particular limitation in selection of inorganic particles, as long as they are electrochemically stable. In other words, there is no particular limitation in inorganic particles that may be used in the present invention, as long as they are not subjected to oxidation and/or reduction at the range of drive voltages (for example, 0-5 V based on Li/Li$^+$) of a battery, to which they are applied. Particularly, it is preferable to use inorganic particles having ion conductivity as high as possible, because such inorganic particles can improve ion conductivity and quality in an electrochemical device. Additionally, when inorganic particles having a high density are used, they have a difficulty in dispersion during a coating step and may increase the weight of a battery to be manufactured. Therefore, it is preferable to use inorganic particles having a density as low as possible. Further, when inorganic particles having a high dielectric constant are used, they can contribute to increase the dissociation degree of an electrolyte salt in a liquid electrolyte, such as a lithium salt, thereby improving the ion conductivity of the electrolyte.

For these reasons, it is preferable to use inorganic particles having a high dielectric constant of 5 or more, preferably of 10 or more, inorganic particles having lithium conductivity or mixtures thereof.

Particular non-limiting examples of inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof.

As used herein, "inorganic particles having lithium ion conductivity" are referred to as inorganic particles containing lithium elements and having a capability of conducting lithium ions without storing lithium. Inorganic particles having lithium ion conductivity can conduct and move lithium ions due to defects present in their structure, and thus can improve lithium ion conductivity and contribute to improve battery quality. Non-limiting examples of such inorganic particles having lithium ion conductivity include: lithim phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, or mixtures thereof.

According to the present invention, inorganic particles having a relatively high dielectric constant are used instead of inorganic particles having no reactivity or having relatively low dielectric constant. Further, the present invention also provides a novel use of inorganic particles as separators.

The above-described inorganic particles, that have never been used as separators, for example $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), hafnia ($HfO_2$), etc., have a high dielectric constant of 100 or more. The inorganic particles also have piezoelectricity so that an electric potential can be generated between both surfaces by the charge formation, when they are drawn or compressed under the application of a certain pressure. Therefore, the inorganic particles can prevent internal short circuit between both electrodes, thereby contributing to improve the safety of a battery. Additionally, when such inorganic particles having a high dielectric constant are combined with inorganic particles having lithium ion conductivity, synergic effects can be obtained.

The organic/inorganic composite porous film according to the present invention can form pores having a size of several micrometers by controlling the size of inorganic particles, content of inorganic particles and the mixing ratio of inorganic particles and binder polymer. It is also possible to control the pore size and porosity.

Although there is no particular limitation in size of inorganic particles, inorganic particles preferably have a size of 0.001-10 µm for the purpose of forming a film having a uniform thickness and providing a suitable porosity. When the size is less than 0.001 µm, inorganic particles have poor dispersibility so that physical properties of the organic/inorganic composite porous film cannot be controlled with ease. When the size is greater than 10 µm, the resultant organic/inorganic composite porous film has an increased thickness under the same solid content, resulting in degradation in mechanical properties. Furthermore, such excessively large pores may increase a possibility of internal short circuit being generated during repeated charge/discharge cycles.

The inorganic particles are present in the mixture of the inorganic particles with binder polymer forming the organic/inorganic composite porous film, preferably in an amount of 50-99 wt %, more particularly in an amount of 60-95 wt % based on 100 wt % of the total weight of the mixture. When the content of the inorganic particles is less than 50 wt %, the binder polymer is present in such a large amount as to decrease the interstitial volume formed among the inorganic particles and thus to decrease the pore size and porosity, resulting in degradation in the quality of a battery. When the content of the inorganic particles is greater than 99 wt %, the polymer content is too low to provide sufficient adhesion among the inorganic particles, resulting in degradation in mechanical properties of a finally formed organic/inorganic composite porous film.

Another component present in the organic/inorganic composite porous film according to the present invention is a binder polymer currently used in the art. The binder polymer preferably has a glass transition temperature ($T_g$) as low as possible, more preferably $T_g$ of between −200° C. and 200° C. Binder polymers having a low Tg as described above are preferable, because they can improve mechanical properties such as flexibility and elasticity of a finally formed film. The polymer serves as binder that interconnects and stably fixes the inorganic particles among themselves, and thus prevents degradation in mechanical properties of a finally formed organic/inorganic composite porous film.

When the binder polymer has ion conductivity, it can further improve the quality of an electrochemical device. However, it is not essential to use a binder polymer having ion conductivity. Therefore, the binder polymer preferably has a dielectric constant as high as possible. Because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

In addition to the above-described functions, the binder polymer used in the present invention may be further characterized in that it is gelled when swelled with a liquid electrolyte, and thus shows a high degree of swelling. Therefore, it is preferable to use a polymer having a solubility parameter of between 15 and 45 MPa$^{1/2}$, more preferably of between 15 and 25 MPa$^{1/2}$, and between 30 and 45 MPa$^{1/2}$. Therefore, hydrophilic polymers having a lot of polar groups are more preferable than hydrophobic polymers such as polyolefins. When the binder polymer has a solubility parameter of less than 15 Mpa$^{1/2}$ or greater than 45 Mpa$^{1/2}$, it has difficulty in swelling with a conventional liquid electrolyte for battery.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide or mixtures thereof. Other materials may be used alone or in combination, as long as they satisfy the above characteristics.

The organic/inorganic composite porous film may further comprise additives other than the inorganic particles and binder polymer.

When the organic/inorganic composite porous film is manufactured by using inorganic particles and a binder polymer, the film may be realized by three types of embodiments, but is not limited thereto.

The first type is an organic/inorganic composite porous film formed by using a mixture of inorganic particles and binder polymer with no additional substrate. The second type is an organic/inorganic composite porous film formed by coating the mixture on a porous substrate having pores, wherein the film coated on the porous substrate includes an active layer obtained by coating the mixture of inorganic particles and binder polymer on the surface of the porous substrate or on a part of the pores in the substrate. The third type is an organic/inorganic composite porous film formed by coating the mixture on a cathode and/or an anode. The third type is a monolithic electrode and film.

In the second embodiment of the organic/inorganic composite porous film according to the present invention, there is no particular limitation in the substrate coated with the mixture of inorganic particles and binder polymer, as long as it is a porous substrate having pores. However, it is preferable to use a heat resistant porous substrate having a melting point of 200° C. or higher. Such heat resistant porous substrates can improve the thermal safety of the organic/inorganic composite porous film under external and/or internal thermal impacts. Non-limiting examples of the porous substrate having a melting point of 200° C. or higher that may be used include polyethylene terephthalate, polybutylene terephthalate, polyester, polyacetal, polyamide, polycarbonate, polyimide, polyetherether ketone, polyether sulfone, polyphenylene oxide, polyphenylene sulfide, polyethylene naphthalene or mixtures thereof. However, other heat resistant engineering plastics may be used with no particular limitation.

Although there is no particular limitation in thickness of the porous substrate, the porous substrate preferably has a thickness of between 1 μm and 100 μm, more preferably of between 5 μm and 50 μm.

When the porous substrate has a thickness of less than 1 μm, it is difficult to maintain mechanical properties. When the porous substrate has a thickness of greater than 100 μm, it may function as resistance layer.

Although there is no particular limitation in pore size and porosity of the porous substrate, the porous substrate preferably has a porosity of between 5% and 95%. The pore size (diameter) preferably ranges from 0.01 μm to 50 μm, more preferably from 0.1 μm to 20 μm. When the pore size and porosity are less than 0.01 μm and 5%, respectively, the porous substrate may function as resistance layer. When the pore size and porosity are greater than 50 μm and 95%, respectively, it is difficult to maintain mechanical properties.

The porous substrate may take the form of a membrane or fiber. When the porous substrate is fibrous, it may be a nonwoven web forming a porous web (preferably, spunbond type web comprising long fibers or melt blown type web).

A spunbond process is performed continuously through a series of steps and provides long fibers formed by heating and melting, which is stretched, in turn, by hot air to form a web. A melt blown process performs spinning of a polymer capable of forming fibers through a spinneret having several hundreds of small orifices, and thus provides three-dimensional fibers having a spider-web structure resulting from interconnection of microfibers having a diameter of 10 μm or less.

The organic/inorganic composite porous film that may be formed in various types of embodiments according to the present invention is characterized in that the film comprises a micropore structure. First, the organic/inorganic composite porous film formed by using the mixture of inorganic particles and polymer alone has a micropore structure formed by interstitial volumes among the inorganic particles serving as support as well as spacer. Next, the organic/inorganic composite porous film formed by coating the mixture on a porous substrate has pore structures present both in the substrate and in the active layer due to the pores present in the porous substrate itself and interstitial volumes among the inorganic particles in the active layer formed on the substrate. Finally, the organic/inorganic composite porous film obtained by coating the mixture on the surface of an electrode has a uniform pore structure formed by interstitial volumes among the inorganic particles in the same manner as the pore structure formed by electrode active material particles in the electrode. Therefore, any embodiment of the organic/inorganic composite porous film according to the present invention has an increased volume of space, into which an electrolyte infiltrates, by virtue of such micropore structures. As a result, it is possible to increase dispersibility and conductivity of lithium ions, resulting in improvement in the quality of a battery.

The pore size and porosity of the organic/inorganic composite porous film mainly depend on the size of inorganic particles. For example, when inorganic particles having a particle diameter of 1 μm or less are used, pores formed thereby also have a size of an or less. The pore structure is filled with an electrolyte injected subsequently and the electrolyte serves to conduct ions. Therefore, the size and porosity of the pores are important factors in controlling the ion conductivity of the organic/inorganic composite porous film. Preferably, the pores size and porosity of the organic/inorganic composite porous film according to the present invention range from 0.01 to 10 μm and from 5 to 95%, respectively.

There is no particular limitation in thickness of the organic/inorganic composite porous film according to the present invention. The thickness may be controlled depending on the quality of a battery. According to the present invention, the film preferably has a thickness of between 1 and 100 μm, more preferably of between 2 and 30 μm. Control of the thickness of the film may contribute to improve the quality of a battery.

There is no particular limitation in mixing ratio of inorganic particles to polymer in the organic/inorganic composite porous film according to the present invention. The mixing ratio can be controlled according to the thickness and structure of a film to be formed finally.

The organic/inorganic composite porous film may be applied to a battery together with a microporous separator (for example, a polyolefin-based separator), depending on the characteristics of a finally formed battery.

The organic/inorganic composite porous film may be manufactured by a conventional process known to one skilled in the art. One embodiment of a method for manufacturing the organic/inorganic composite porous film according to the present invention, includes the steps of: (a) dissolving a binder polymer into a solvent to form a polymer solution; (b) adding inorganic particles to the polymer solution obtained from step (a) and mixing them; and (c) coating the mixture obtained from step (b) on the surface of a substrate, followed by drying, and then detaching the substrate. Hereinafter, the method for manufacturing the organic/inorganic composite porous film according to the present invention will be explained in detail.

(1) First, a binder polymer is dissolved in a suitable organic solvent to provide a polymer solution.

It is preferable that the solvent has a solubility parameter similar to that of the binder polymer to be used and a low boiling point. Such solvents can be mixed uniformly with the polymer and can be removed easily after coating the polymer. Non-limiting examples of the solvent that may be used include acetone, tetrahydrofuran, methylene chloride, chloroform, dimethylformamide, N-methyl-2-pyrrolidone (NMP), cyclohexane, water and mixtures thereof.

(2) Next, inorganic particles are added to and dispersed in the polymer solution obtained from the preceding step to provide a mixture of inorganic particles with binder polymer.

It is preferable to perform a step of pulverizing inorganic particles after adding the inorganic particles to the binder polymer solution. The time needed for pulverization is suitably 1-20 hours. The particle size of the pulverized particles ranges preferably from 0.001 and 10 μm. Conventional pulverization methods, preferably a method using a ball mill may be used. Although there is no particular limitation in composition of the mixture containing inorganic particles and binder polymer, such composition can contribute to control the thickness, pore size and porosity of the organic/inorganic composite porous film to be formed finally.

In other words, as the weight ratio (I/P) of the inorganic particles (I) to the polymer (P) increases, porosity of the organic/inorganic composite porous film according to the present invention increases. Therefore, the thickness of the organic/inorganic composite porous film increases under the same solid content (weight of the inorganic particles weight of the binder polymer). Additionally, the pore size increases in proportion to the pore formation among the inorganic particles. When the size (particle diameter) of inorganic particles increases, interstitial distance among the inorganic particles also increases, thereby increasing the pore size.

(3) The mixture of inorganic particles with binder polymer is coated on a substrate, followed by drying, and then the substrate is detached to provide the organic/inorganic composite porous film.

Particular examples of the substrate that may be used include Teflon sheets or the like generally used in the art, but are not limited thereto.

In order to coat the porous substrate with the mixture of inorganic particles and binder polymer, any methods known to one skilled in the art may be used. It is possible to use various processes including dip coating, die coating, roll coating, comma coating or combinations thereof.

In this step, when the substrate is a porous substrate having pores or a preformed electrode, various types of organic/inorganic composite porous films can be obtained. The mixture of inorganic particles and polymer may be coated on the surface of porous substrate, on the surface of electrode, and on a part of the pores present in the substrate. In this step, the step of detaching a substrate may be omitted.

The organic/inorganic composite porous film according to the present invention, obtained as described above, may be used as separator in an electrochemical device, preferably in a lithium secondary battery. Additionally, the organic/inorganic composite porous film may be coated with a conventional polymer (for example, a polymer capable of being swelled with an electrolyte) on one surface or both surfaces so as to be used as separator.

If the binder polymer used in the film is a polymer capable of being gelled when swelled with a liquid electrolyte, the polymer may react with the electrolyte injected after assembling a battery by using the separator, and thus be gelled to form a gel type organic/inorganic composite electrolyte.

The gel type organic/inorganic composite electrolyte according to the present invention is prepared with ease compared to gel type polymer electrolytes according to the prior art, and has a large space to be filled with a liquid electrolyte due to its microporous structure, thereby showing excellent ion conductivity and a high degree of swelling with electrolyte, resulting in improvement in the quality of a battery.

Further, the present invention provides an electrochemical device comprising: (a) a cathode; (b) an anode; (c) the organic/inorganic composite porous film according to the present invention, interposed between the cathode and anode; and (d) an electrolyte.

Such electrochemical devices include any devices in which electrochemical reactions occur and particular examples thereof include all kinds of primary batteries, secondary batteries, fuel cells, solar cells or capacitors. Particularly, the electrochemical device is a lithium secondary battery including a lithium secondary metal battery, lithium secondary ion battery, lithium secondary polymer battery or lithium secondary ion polymer battery.

According to the present invention, the organic/inorganic composite porous film contained in the electrochemical device serves as separator. If the polymer used in the film is a polymer capable of being gelled when swelled with electrolyte, the film may serve also as electrolyte.

In addition to the above organic/inorganic composite porous film, a microporous separator may also be used. Particular examples of the macroporous separator that may be used includes currently used polyolefin-based separators or at least one porous substrate having a melting point of 200° C., selected from the group consisting of polyethylene terephthalate, polybutylene terephthalate, polyester, polyacetal, polyamide, polycarbonate, polyimide, polyetherether ketone, polyether sulfone, polyphenylene oxide, polyphenylene sulfide and polyethylene naphthalene.

The electrochemical device may be manufactured by a conventional method known to one skilled in the art. In one embodiment of the method for manufacturing the electrochemical device, the electrochemical device is assembled by using the organic/inorganic composite porous film interposed between a cathode and an anode, and then an electrolyte is injected. The electrode that may be applied together with the organic/inorganic composite porous film according to the present invention may be formed by applying an electrode active material on a current collector according to a method known to one skilled in the art. Particularly, cathode active materials may include any conventional cathode active materials currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, anode active materials may include any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof. However, the electrolyte that may be used in the present invention is not limited to the above examples.

More particularly, the electrolyte may be injected in a suitable step during the manufacturing process of an electrochemical device, according to the manufacturing process and desired properties of a final product. In other words, electrolyte may be injected, before an electrochemical device is assembled or in a final step during the assemblage of an electrochemical device.

Processes that may be used for applying the organic/inorganic composite porous film to a battery include not only a conventional winding process but also a lamination (stacking) and folding process of a separator and electrode.

When the organic/inorganic composite porous film according to the present invention is applied to a lamination process, it is possible to significantly improve the thermal safety of a battery, because a battery formed by a lamination and folding process generally shows more severe heat shrinking of a separator compared to a battery formed by a winding process. Additionally, when a lamination process is used, there is an advantage in that a battery can be assembled with ease by virtue of excellent adhesion of the polymer present in the organic/inorganic composite porous film according to the present invention. In this case, the adhesion can be controlled depending on the content of inorganic particles and polymer, and properties of the polymer. More particularly, as the polarity of the polymer increases and as the glass transition temperature ($T_g$) or melting point ($T_m$) of the polymer decreases, higher adhesion between the organic/inorganic composite porous film and electrode can be obtained.

BEST MODE FOR CARRYING OUT THE INVENTION

Reference will now be made in detail to the preferred embodiments of the present invention. It is to be understood that the following examples are illustrative only and the present invention is not limited thereto.

Reference Example

Variations in Ion Conductivity Depending on Content of Inorganic Particles

The organic/inorganic composite system according to the present invention was observed to determine variations in ion conductivity depending on the content of inorganic particles.

The organic/inorganic composite film according to the present invention was dipped into the electrolyte formed of ethylene carbonate/propylene carbonate/diethyl carbonate (EC/PC/DEC=30:20:50 on the basis of wt %) containing 1M lithium hexafluorophosphate ($LiPF_6$) dissolved therein. The film, into which the electrolyte is impregnated, was measured for ion conductivity by using Metrohm 712 instrument at a temperature of 25° C.

Figure 6:
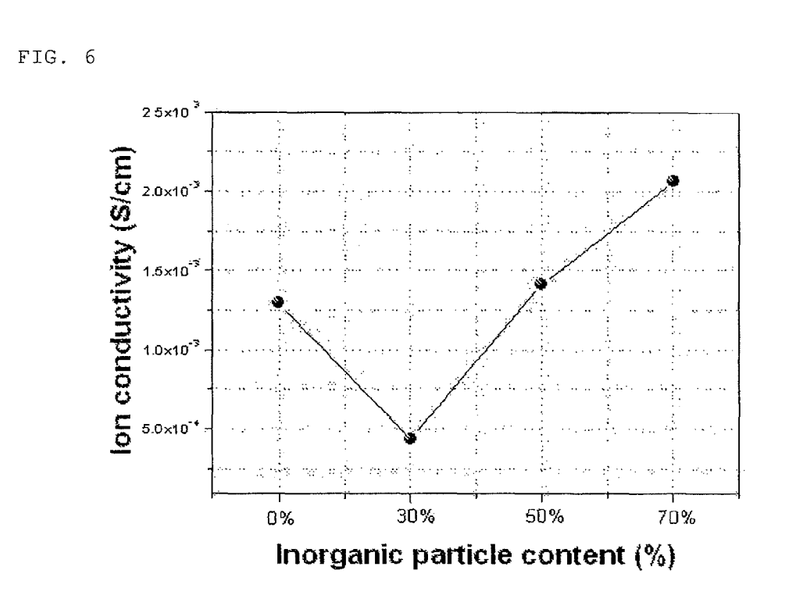
FIG. 6 is a graph showing variations in ion conductivity depending on the content of inorganic particles, in the organic/inorganic composite porous film according to the present invention.

As shown in FIG. 6, as the content of inorganic particles increases, ion conductivity also increases. Particularly, when 50 wt % or more of inorganic particles are used, ion conductivity increases significantly.

Example 1-9

Preparation of Organic/Inorganic Composite Porous Film and Manufacture of Lithium Secondary Battery Using the Same Example 1

1-1. Preparation of Organic/Inorganic Composite Porous Film (PVdF—HFP/BaTiO$_3$)

PVdF—HFP polymer (polyvinylidene fluoride-hexafluoropropylene copolymer) was added to tetrahydrofuran (THF) in the amount of about 5 wt % and dissolved therein at SC C for about 12 hours or more to form a polymer solution. To the polymer solution obtained as described above, BaTiO$_3$ powder having a particle diameter of about 400 nm was added with the concentration of 20 wt % on the total solid content basis, and then dispersed to form a mixed solution (BaTiO$_3$/PVDF—HFP=80:20 (weight ratio)). Then, the mixed solution obtained as described above was coated on a Teflon sheet by using a doctor blade coating method. After coating, THF was dried and the Teflon sheet was detached to obtain a final organic/inorganic composite porous film (see, FIG. 1). The final film had a thickness of about 30 μm. After measuring with a porosimeter, the final organic/inorganic composite porous film had a pore size of 0.4 μm and a porosity of 60%.

1-2. Manufacture of Lithium Secondary Battery (Manufacture of Cathode)

To N-methyl-2-pyrrolidone (NMP) as a solvent, 94 wt % of lithium cobalt composite oxide (LiCoO$_2$) as cathode active material, 3 wt % of carbon black as conductive agent and 3 wt % of PVdF (polyvinylidene fluoride) as binder were added to form slurry for a cathode. The slurry was coated on Al foil having a thickness of 20 μm as cathode collector and dried to form a cathode.

(Manufacture of Anode)

To N-methyl-2-pyrrolidone (NMP) as solvent, 96 wt % of carbon powder as anode active material, 3 wt % of PVdF (polyvinylidene fluoride) as binder and 1 wt % of carbon black as conductive agent were added to form mixed slurry for an anode. The slurry was coated on Cu foil having a thickness of 10 μm as anode collector and dried to form an anode.

(Manufacture of Battery)

The cathode and anode obtained as described above were stacked with the organic/inorganic composite porous film obtained as described in Example 1-1 to form an assembly. Then, an electrolyte (ethylene carbonate (EC)/propylene carbonate (PC)/diethyl carbonate (DEC)=30:20:50 (wt %) containing 1M of lithium hexafluorophosphate (LiPF$_6$)) was injected thereto to provide a lithium secondary battery.

Example 2

Example 1 was repeated to provide a lithium secondary battery, except that mixed powder of BaTiO$_3$ and Al$_2$O$_3$ (weight ratio=20:80) was used instead of BaTiO$_3$ powder to obtain an organic/inorganic composite porous film (PVdF—HFP/BaTiO$_3$—Al$_2$O$_3$). After measuring with a porosimeter, the final organic/inorganic composite porous film had a thickness of 25 μm, pore size of 0.3 μm and a porosity of 57%.

Example 3

Example 1 was repeated to provide a lithium secondary battery, except that PMNPT(lead magnesium niobate-lead titanate) powder was used instead of BaTiO$_3$ powder to obtain an organic/inorganic composite porous film (PVdF—HFP/PMNPT). After measuring with a porosimeter, the final organic/inorganic composite porous film had a thickness of 30 μm, pore size of 0.3 μm and a porosity of 60%.

Example 4

Example 1 was repeated to provide a lithium secondary battery, except that PVdF—HFP was not used but about 2 wt % of carboxymethyl cellulose (CMC) polymer was added to water and dissolved therein at 60° C. for about 12 hours or more to form a polymer solution, and the polymer solution was used to obtain an organic/inorganic composite porous film (CMC/BaTiO$_3$). After measuring with a porosimeter, the final organic/inorganic composite porous film had a thickness of 25 μm, pore size of 0.4 μm and a porosity of 58%.

Example 5

Example 1 was repeated to provide a lithium secondary battery, except that PZT powder was used instead of BaTiO$_3$ powder to obtain an organic/inorganic composite porous film (PVdF—HFP/PZT). After measuring with a porosimeter, the final organic/inorganic composite porous film had a thickness of 25 μm, pore size of 0.4 μm and a porosity of 62%.

Example 6

Example 1 was repeated to provide a lithium secondary battery, except that PLZT powder was used instead of BaTiO$_3$ powder to obtain an organic/inorganic composite porous film (PVdF—HFP/PLZT). After measuring with a porosimeter, the final organic/inorganic composite porous film had a thickness of 25 μm, pore size of 0.3 μm and a porosity of 58%.

Example 7

Example 1 was repeated to provide a lithium secondary battery, except that HfO$_2$ powder was used instead of BaTiO$_3$ powder to obtain an organic/inorganic composite porous film (PVdF—HFP/HfO$_2$). After measuring with a porosimeter, the final organic/inorganic composite porous film had a thickness of 28 μm, pore size of 0.4 μm and a porosity of 60%.

Example 8

Example 1 was repeated to provide a lithium secondary battery, except that lithium titanium phosphate (LiTi$_2$(PO$_4$)$_3$) powder having a particle diameter of about 400 nm was used in an amount of the total solid content of 20 wt %, instead of BaTiO$_3$ powder, to obtain an organic/inorganic composite porous film (PVdF—HFP/LiTi$_2$(PO$_4$)$_3$) having a thickness of about 20 μm. After measuring with a porosimeter, the final organic/inorganic composite porous film had a pore size of 0.5 μm and porosity of 62%.

Example 9

Example 1 was repeated to provide a lithium secondary battery, except that mixed powder of BaTiO$_3$ and LiTi$_2$(PO$_4$)$_3$ (weight ratio=50:50) was used instead of BaTiO$_3$ powder to obtain an organic/inorganic composite porous film (PVdF—HFP/LiTi$_2$(PO$_4$)$_3$—BaTiO$_3$). After measuring with a porosimeter, the final organic/inorganic composite porous film had a thickness of 25 μm, pore size of 0.3 μm and a porosity of 60%.

Comparative Examples 1-4

Comparative Example 1

Figure 3:
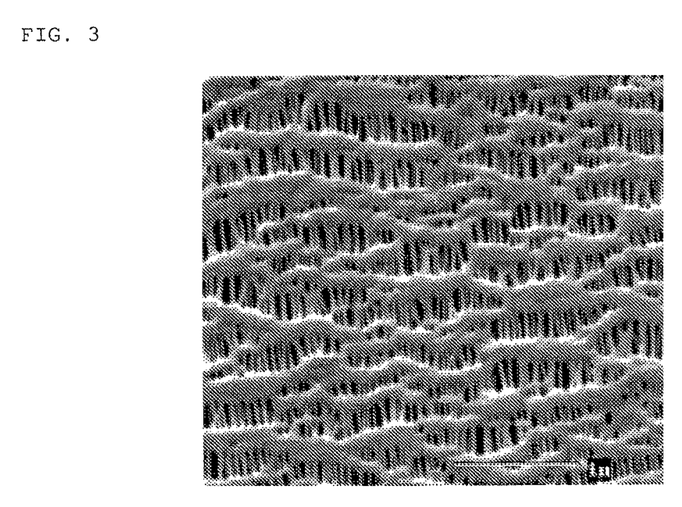
FIG. 3 is a photograph taken by SEM showing a polyolefin-based separator (PP/PE/PP) used in Comparative Example 1.

Example 1 was repeated to provide a lithium secondary battery, except that a conventional poly propylene/polyethylene/polypropylene (PP/PE/PP) separator (see, FIG. 3) was used.

Comparative Example 2

Example 1 was repeated to provide an organic/inorganic composite porous film and lithium secondary battery comprising the same, except that BaTiO$_3$ and PVDF—HFP were used in a weight ratio of 20:80. After measuring the BaTiO$_3$/PVdF—HFP with a porosimeter, the final organic/inorganic composite porous film had a pore size of 0.01 μm or less and a porosity of about 10%.

Comparative Example 3

Example 1 was repeated to provide an organic/inorganic composite porous film and lithium secondary battery comprising the same, except that $LiTi_2(PO_4)_3$ and PVDF—HFP were used in a weight ratio of 10:90. After measuring the $LiTi_2(PO_4)_3$/PVdF—HFP with a porosimeter, the final organic/inorganic composite porous film had a pore size of 0.01 μm or less and a porosity of about 5%.

Comparative Example 4

Manufacture of Porous Film Using Plasticizer

Dimethyl carbonate (DMC) was selected as plasticizer and used along with PVdF—HFP in a ratio of 30:70 (on the wt % basis) and THE as solvent to form a porous film. Dimetyl carbonate used in the film as plasticizer was extracted from the film by using methanol to provide a final porous film and a lithium secondary battery comprising the same. After measuring the porous PVdF—HFP film with a porosimeter, the porous film had a pore size of 0.01 μm or less and a porosity of about 30%.

Experimental Example 1

Surface Analysis of Organic/Inorganic Composite Porous Film

The following test was performed to analyze the surface of an organic/inorganic composite porous film according to the present invention.

The sample used in this test was PVdF—HFP/$BaTiO_3$ obtained according to Example 1. As controls, a PP/PE/PP separator according to Comparative Example 1 and the porous film using a plasticizer according to Comparative Example 4 were used.

When analyzed by using Scanning Electron Microscope (SEM), the PP/PE/PP separator according to Comparative Example 1 (see FIG. 3) and the porous film according to Comparative Example 4 showed a conventional microporous structure. More particularly, the porous film according to Comparative Example 4 had a dense pore structure formed independently from the inorganic particles present on the surface of the film. It is thought that the dense pore structure is formed by artificial extraction of the plasticizer.

On the contrary, the organic/inorganic composite porous film according to the present invention showed a micropore structure formed by the inorganic particles as main component of the film (for example, inorganic particles with a high dielectric constant and/or lithium ion conductivity). Additionally, it could be seen that the polymer was coated on the surface of the inorganic particles (see, FIG. 2).

Experimental Example 2

Evaluation of Heat Shrinkage of Organic/Inorganic Composite Porous Film

The following experiment was performed to compare the organic/inorganic composite porous film with a conventional separator.

The organic/inorganic composite porous film (PVdF-CTFE/$BaTiO_3$) according to Example 1 was used as sample. A conventional PP/PE/PP separator and PE separator were used as controls.

Figure 4:
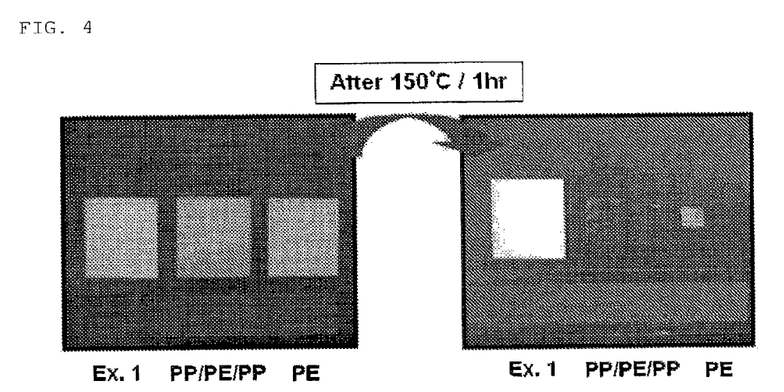
FIG. 4 is a photograph showing the organic/inorganic composite porous film (PVdF—HFP/$BaTiO_3$) according to Example 1 compared to a currently used PP/PE/PP separator and PE separator, after each of the samples is maintained at 150° C. for 1 hour.

Each of the test samples was checked for its heat shrinkage after stored at a high temperature of 150° C. for 1 hour. The test samples provided different results after the lapse of 1 hour at 150° C. The PP/PE/PP separator as control was shrunk due to high temperature to leave only the outer shape thereof. Similarly, the PE separator was shrunk to about 1/10 of its original size. On the contrary, the organic/inorganic composite porous film according to the present invention showed good results with no heat shrinkage (see, FIG. 4)

As can be seen from the foregoing, the organic/inorganic composite porous film according to the present invention has excellent thermal safety.

Experimental Example 3

Evaluation for Safety of Lithium Secondary Battery

The following test was performed to evaluate the safety of each lithium secondary battery comprising the organic/inorganic composite porous film according to the present invention.

Lithium secondary batteries according to Examples 1-9 were used as samples. As controls, used were the battery using a currently used PP/PE/PP separator according to Comparative Example 1, the battery using the $BaTiO_3$/PVdF—HFP film (weight ratio=20:80 on the wt % basis) as separator according to Comparative Example 2, and the battery using the $LiTi_2(PO_4)_3$/PVdF—HFP film (weight ratio=10:90 on the wt % basis) as separator according to Comparative Example 3.

3-1. Hot Box Test

Each battery was stored at high temperatures of 150° C. and 160° C. for 1 hour and then checked. The results are shown in the following Table 1.

After storing at high temperatures, the battery using a currently used PP/PE/PP separator according to Comparative Example 1 caused explosion when stored at 160° C. for 1 hour. This indicates that polyolefin-based separators cause extreme heat shrinking, melting and breakage when stored at high temperature, resulting in internal short circuit between both electrodes (i.e., a cathode and an anode) of a battery. On the contrary, lithium secondary batteries comprising an organic/inorganic composite porous film according to the present invention showed such a safe state as to prevent firing and burning even at a high temperature of 160° C. (see, Table 1).

Therefore, it can be seen that the lithium secondary battery comprising an organic/inorganic composite porous film according to the present invention has excellent thermal safety.

TABLE 1

| | Hot Box Test Conditions | |
|---|---|---|
| | 150° C./1 hr | 160° C./1 hr |
| Ex. 1 | ○ | ○ |
| Ex. 2 | ○ | ○ |
| Ex. 3 | ○ | ○ |
| Ex. 4 | ○ | ○ |
| Ex. 5 | ○ | ○ |
| Ex. 6 | ○ | ○ |
| Ex. 7 | ○ | ○ |
| Ex. 8 | ○ | ○ |
| Ex. 9 | ○ | ○ |
| Comp. Ex. 1 | ○ | X |
| Comp. Ex. 2 | ○ | ○ |
| Comp. Ex. 3 | ○ | ○ |

3-2. Overcharge Test

Each battery was charged under the conditions of 6V/1A and 10V/1A and then checked. The results are shown in the following Table 2.

Figure 5:
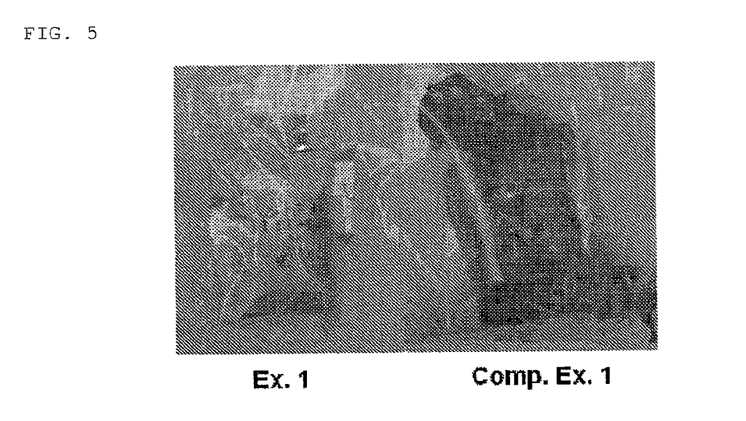
FIG. 5 is a picture showing the results of an overcharge test for the lithium secondary battery including a currently used PP/PE/PP separator according to Comparative Example 1 and the battery including the organic/inorganic composite porous film (PVdF—HFP/$BaTiO_3$) according to Example 1.

After checking, the battery using a currently used PP/PE/PP separator according to Comparative Example 1 exploded (see, FIG. 5). This indicates that the polyolefin-based separator is shrunk by overcharge of the battery to cause short circuit between electrodes, resulting in degradation in safety of the battery. On the contrary, each lithium secondary battery comprising an organic/inorganic composite porous film according to the present invention showed excellent safety under overcharge conditions (see, Table 2 and FIG. 5).

TABLE 2

| | Overcharge Test Conditions | |
|---|---|---|
| | 6 V/IA | 10 V/1 A |
| Ex. 1 | ○ | ○ |
| Ex. 2 | ○ | ○ |
| Ex. 3 | ○ | ○ |
| Ex. 4 | ○ | ○ |
| Ex. 5 | ○ | ○ |
| Ex. 6 | ○ | ○ |
| Ex. 7 | ○ | ○ |
| Ex. 8 | ○ | ○ |
| Ex. 9 | ○ | ○ |
| Comp. Ex. 1 | ○ | X |
| Comp. Ex. 2 | ○ | ○ |
| Comp. Ex. 3 | ○ | ○ |

Experimental Example 4

Evaluation for Quality of Lithium Secondary Battery

The following tests were performed in order to determine the charge/discharge capacity of each lithium secondary battery comprising an organic/inorganic composite porous film according to the present invention.

Lithium secondary batteries according to Examples 1-9 were used as samples. As controls, used were the battery using a currently used PP/PE/PP separator according to Comparative Example 1, the battery using the BaTiO$_3$/PVdF—HFP film (weight ratio=20:80 on the wt % basis) as separator according to Comparative Example 2, the battery using the LiTi$_2$(PO$_4$)$_3$/PVdF—HFP film (weight ratio=10:90 on the wt % basis) as separator according to Comparative Example 3, and the battery using the porous PVdF—HFP film obtained by using a plasticizer as separator according to Comparative Example 4.

Each battery having a capacity of 760 mAh was subjected to cycling at a discharge rate of 0.5 C, 1 C and 2 C. The following Table 3 shows the discharge capacity of each battery, the capacity being expressed on the basis of C-rate characteristics.

After performing the test, the battery according to Comparative Examples 2 using, as separator, an organic/inorganic composite porous film that includes a mixture containing inorganic particles with a high dielectric constant and a binder polymer in a ratio of 20:80 (on the wt % basis) and the battery according to Comparative Examples 3 using, as separator, an organic/inorganic composite porous film that includes a mixture containing inorganic particles with lithium ion conductivity and a binder polymer in a ratio of 10:90 (on the wt % basis), showed a significant drop in capacity depending on discharge rates, as compared to the batteries using, as separators, the organic/inorganic composite porous film obtained from the above Examples according to the present invention and a conventional polyolefin-based separator (see, Table 3). This indicates that such relatively low amount of inorganic particles compared to the polymer may decrease the pore size and porosity in the pore structure formed by interstitial volume among the inorganic particles, resulting in degradation in the quality of a battery. Additionally, the battery using the porous film having a pore structure artificially formed by using a plasticizer as separator according to Comparative Example 4 also showed a significant drop in capacity depending on discharge rates in the same manner as the batteries according to Comparative Examples 2 and 3.

On the contrary, lithium secondary batteries comprising the organic/inorganic composite porous film according to the present invention showed C-rate characteristics comparable to those of the battery using a conventional polyolefin-based separator under a discharge rate of up to 2 C (see, Table 3).

TABLE 3

| | Discharge Rate (mAh) | | |
|---|---|---|---|
| | 0.5 C | 1 C | 2 C |
| Ex. 1 | 757 | 746 | 694 |
| Ex. 2 | 756 | 748 | 693 |
| Ex. 3 | 756 | 744 | 691 |
| Ex. 4 | 758 | 747 | 694 |
| Ex. 5 | 759 | 750 | 698 |
| Ex. 6 | 755 | 742 | 690 |
| Ex. 7 | 758 | 747 | 694 |
| Ex. 8 | 756 | 745 | 793 |
| Ex. 9 | 757 | 746 | 792 |
| Comp. Ex. 1 | 758 | 746 | 693 |
| Comp. Ex. 2 | 695 | 562 | 397 |
| Comp. Ex. 3 | 642 | 555 | 385 |
| Comp. Ex. 4 | 698 | 585 | 426 |

INDUSTRIAL APPLICABILITY

As can be seen from the foregoing, the organic/inorganic composite porous film according to the present invention comprises inorganic particles and a binder polymer, wherein the inorganic particles are interconnected among themselves and fixed by the binder polymer and interstitial volumes among the inorganic particles form a heat resistant micropore structure. Therefore, it is possible to increase the space to be filled with an electrolyte, and thus to improve a degree of swelling with electrolyte and lithium ion conductivity. As a result, the organic/inorganic composite porous film according to the present invention contributes to improve the thermal safety and quality of a lithium secondary battery using the same as separator.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A lithium secondary battery comprising:
   a cathode;
   an anode;
   an electrolyte; and
   a separator comprising:
   a porous substrate, which is not a cathode and/or an anode, and an organic/inorganic composite porous film coated directly on a surface of the porous substrate, the organic/inorganic composite porous film comprising:

inorganic particles which have piezoelectricity;
a binder polymer disposed on the inorganic particles and interconnecting the inorganic particles to each other; and
interstitial volumes defined by the interconnected inorganic particles,
wherein said interstitial volumes defined by the interconnected inorganic particles directly form a uniform pore structure 3-dimensionally throughout the organic/inorganic composite porous film,
wherein the organic/inorganic composite porous film is obtained by coating the mixture of the inorganic particles and binder polymer on the surface of the porous substrate,
wherein the organic/inorganic composite porous film is not formed by coating the mixture of the inorganic particles and binder polymer on the surface of a cathode or an anode,
wherein the organic/inorganic composite porous film is applied to the lithium secondary battery by a lamination process or a folding process of the separator with the cathode and the anode, and
wherein the inorganic particles are $Pb(Mg_{1/3}Nb_{2/3})O_3$—$PbTiO_3$ (PMN-PT), or hafnia ($HfO_2$).

2. The lithium secondary battery according to claim 1, wherein the inorganic particles have a size of between 0.001 µm and 10 µm.

3. The lithium secondary battery according to claim 1, wherein the inorganic particles are present in the mixture of inorganic particles with the binder polymer in an amount of 50-99 wt % based on 100 wt % of the mixture.

4. The lithium secondary battery according to claim 1, wherein the binder polymer has a glass transition temperature (Tg) of between −200° C. and 200° C.

5. The lithium secondary battery according to claim 1, wherein the binder polymer has a solubility parameter of between 15 and 45 $MPa^{1/2}$.

6. The lithium secondary battery according to claim 1, wherein the binder polymer is at least one selected from the group consisting of polyvinylidiene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl, polyvinylalcohol, cyanoethylcellulose, cyanoethylsucrose pullulan, carboxymethyl cellulose, acrylonitrile-styrene-butadiene copolymer and polyimide.

7. The lithium secondary battery according to claim 1, wherein the organic/inorganic composite porous film has a pore size of between 0.001 and 10 µm.

8. The lithium secondary battery according to claim 1, wherein the organic/inorganic composite porous film has a porosity of between 5% and 95%.

9. The lithium secondary battery according to claim 1, wherein the organic/inorganic composite porous film has a thickness of between 1 and 100 µm.

10. The lithium secondary battery according to claim 1, which further comprises a microporous separator.

11. The lithium secondary battery according to claim 10, wherein the microporous separator is a polyolefin-based separator, or at least one porous substrate having a melting point of 200° C. or higher, selected from the group consisting of polyethylene terephthalate, polybutylene terephthalate, polyester, polyacetal, polyamide, polycarbonate, polyimide, polyetherether ketone, polyether sulfone, polyphenylene oxide, polyphenylene sulfidro and polyethylene naphthalene.

12. The lithium secondary battery of claim 1, wherein the composite porous film is obtained by directly coating the porous substrate with a slurry of dispersed inorganic particles in a solution obtained by dissolving a binder polymer in a solvent.

13. The lithium secondary battery of claim 1, wherein the composite porous film is formed by applying a slurry of the inorganic particles and the binder polymer directly on the surface of the porous substrate and then drying the coating.

14. The lithium secondary battery of claim 1, wherein the interstitial volumes have a substantially uniform size.

15. A method for manufacturing the lithium secondary battery according to claim 1, which comprises the steps of:
(a) dissolving a binder polymer into a solvent to form a polymer solution;
(b) adding inorganic particles to the polymer solution obtained from step (a) and mixing them; and
(c) coating the mixture of inorganic particles with binder polymer obtained from step (b) on a substrate, followed by drying, and then detaching the substrate.

* * * * *